US008246291B2

(12) United States Patent
Wolford

(10) Patent No.: US 8,246,291 B2
(45) Date of Patent: Aug. 21, 2012

(54) THERMAL SYSTEM FOR A WORKING MEMBER OF A POWER PLANT

(75) Inventor: Robert Lee Wolford, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 631 days.

(21) Appl. No.: 12/470,146

(22) Filed: May 21, 2009

(65) Prior Publication Data
US 2010/0296910 A1 Nov. 25, 2010

(51) Int. Cl.
F01D 25/02 (2006.01)
(52) U.S. Cl. ............... 415/1; 415/115; 415/200; 416/1; 416/97 A; 416/231 R; 416/241 R; 60/39.093
(58) Field of Classification Search ............ 415/1, 115, 415/200; 416/39, 90 R, 95, 96 R, 97 R, 229 R, 416/231 R, 229 A, 232, 241 R, 241 A; 60/39.093; 244/134 R
See application file for complete search history.

(56) References Cited

U.S. PATENT DOCUMENTS

| | | | |
|---|---|---|---|
| 2,680,345 A | 6/1954 | Frost | |
| 3,057,154 A * | 10/1962 | Sherlaw et al. ............ | 60/39.093 |
| 3,123,283 A * | 3/1964 | Leis .............. | 415/115 |
| 3,695,778 A * | 10/1972 | Taylor ............. | 416/92 |
| 4,302,155 A * | 11/1981 | Grimes et al. ............ | 416/144 |
| 4,629,397 A | 12/1986 | Schweitzer | |
| 4,782,658 A | 11/1988 | Perry | |
| 4,831,819 A * | 5/1989 | Norris et al. ............ | 60/39.093 |
| 5,029,440 A | 7/1991 | Graber et al. | |
| 5,220,785 A | 6/1993 | Miller | |
| 5,397,217 A | 3/1995 | DeMarche et al. | |
| 5,623,821 A | 4/1997 | Bouiller et al. | |
| 6,139,278 A * | 10/2000 | Mowbray et al. ......... | 416/229 A |
| 6,145,787 A | 11/2000 | Rolls | |
| 6,207,939 B1 | 3/2001 | Allaire et al. | |
| 6,827,556 B2 * | 12/2004 | Simon ..................... | 416/241 R |
| 6,890,152 B1 | 5/2005 | Thisted | |
| 7,217,091 B2 | 5/2007 | LeMieux | |
| 7,246,480 B2 | 7/2007 | Ritland | |
| 7,500,828 B2 | 3/2009 | Landis | |
| 2007/0187381 A1 | 8/2007 | Vontell, Sr. et al. | |
| 2009/0020647 A1 | 1/2009 | Porte | |

* cited by examiner

Primary Examiner — Igor Kershteyn
(74) Attorney, Agent, or Firm — Krieg DeVault LLP

(57) ABSTRACT

A working member for a power plant is disclosed herein. The working member includes a body defining at least one working surface of the working member. The at least one working surface is operable to contact a working fluid. The body also includes at least one inner surface opposite the at least one working surface. The working member also includes an interior chamber defined within at least part of the body proximate to the at least one working surface. The working member also includes at least one inlet to the interior chamber. The working member also includes at least one outlet from the interior chamber. The working member also includes a quantity of open-cell foam positioned in the interior chamber between the inlet and the outlet. The quantity of open-cell foam fills less than all of the interior chamber such that at least one empty space is defined in the interior chamber between the at least one inner surface and the quantity of open-cell foam.

23 Claims, 4 Drawing Sheets

US 8,246,291 B2

THERMAL SYSTEM FOR A WORKING MEMBER OF A POWER PLANT

BACKGROUND OF THE INVENTION

1. Field of the Invention

The invention relates to a working member such as a vane, blade or any structure interacting with working fluid in a power plant such as a turbine engine, and more particularly to a system for transferring thermal energy between the working member and a thermal fluid for, by way of example and not limitation, heating and deicing a strut of an intake assembly.

2. Description of Related Prior Art

U.S. Pat. No. 5,029,440 discloses hollow inlet guide vanes in the air intake assembly of a gas turbine engine. The inlet guide vanes are working members, each having at least one surface that functions to act on a working fluid. Generally, a working fluid can be air, a mixture of fuel and air, and/or post-combustion gases. A working member can cause movement of the working fluid or can be driven in movement by the working fluid. A surface of the working member that acts on the working fluid is referred to as the working surface. Generally, a working member has a thickness dimension substantially less than its width or length. Working members can take forms other than inlet guide vanes, such as inlet struts, blades, vanes spaced from the inlet, or impellers.

A gas turbine engine is a form of power plant. A power plant is capable of driving a load by the conversion of heat, pressure, radiant, and/or gravitational energy into mechanical motion. Power plants can include a motor in combination with the motor's energy supply or its exhaust treatment.

In the '440 patent, an interior chamber of the inlet guide vanes are supplied with pressurized bleed air. The interior of the vanes are provided with orifices through which the bleed air must flow, and those orifices are tuned to a desired frequency which sets up vane vibrations. This arrangement provides deicing by both the supply of heated bleed air which impinges on the selected areas of the vanes and by the vibrations which are set up in the vanes, and it does so simply with the use of the bleed air.

U.S. Pat. No. 7,500,828 discloses a turbine airfoil used in a gas turbine engine that includes a plurality of cavities opening in a direction facing the airfoil surface. Each cavity has cooling holes communicating with an internal cooling fluid passage of the airfoil. The airfoil surface above the cavity is a thermal barrier coating having a plurality of cooling holes communicating with the cavity. Each cavity is filled with a porous metal or foam metal material. Heat is transferred from the airfoil surface to the porous metal. A cooling fluid passes through the porous metal, attracts heat from the porous metal, and flows out the holes onto the airfoil surface to cool the airfoil.

SUMMARY OF THE INVENTION

In summary, the invention is a working member for a power plant. The working member includes a body defining at least one working surface of the working member. The at least one working surface is operable to contact a working fluid. The body also includes at least one inner surface opposite the at least one working surface. The working member also includes an interior chamber defined within at least part of the body proximate to the at least one working surface. The working member also includes at least one inlet to the interior chamber. The working member also includes at least one outlet from the interior chamber. The working member also includes a quantity of open-cell foam positioned in the interior chamber between the inlet and the outlet. The quantity of open-cell foam fills less than all of the interior chamber such that at least one empty space is defined in the interior chamber between the at least one inner surface and the quantity of open-cell foam.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

The current invention, as exemplified in the embodiment described immediately below and defined by the claims further below, is a working member of a power plant. The exemplary working member can be a strut of an air intake assembly of a turbine engine, but the invention is not limited to the exemplary embodiment. A working member includes at least one surface (or a part of at least one surface) that contacts a working fluid during operation of the power plant. This "working" surface interacts with the working fluid such that movement of the working member causes movement of the working fluid, movement of the working fluid causes movement of the working member, and/or interaction with the working member results in a change in one or more properties of the working fluid such as direction, speed, or energy. The working member can be fixedly positioned in the flow path and change the direction of flow, such as a strut of an air intake assembly. The working member can be movably positioned in the flow path, such as an adjustable vane, a spinning blade or an impeller. The invention can be applied in any of these forms of working members in alternative embodiments.

The invention can be applied to heat the working surface. In operation, the working surface can be subjected to undesirable temperature-related conditions. For example, a working surface of an impeller or an intake strut can be susceptible to being covered by ice. The invention can be applied to heat an impeller or an intake strut.

Figure 1:
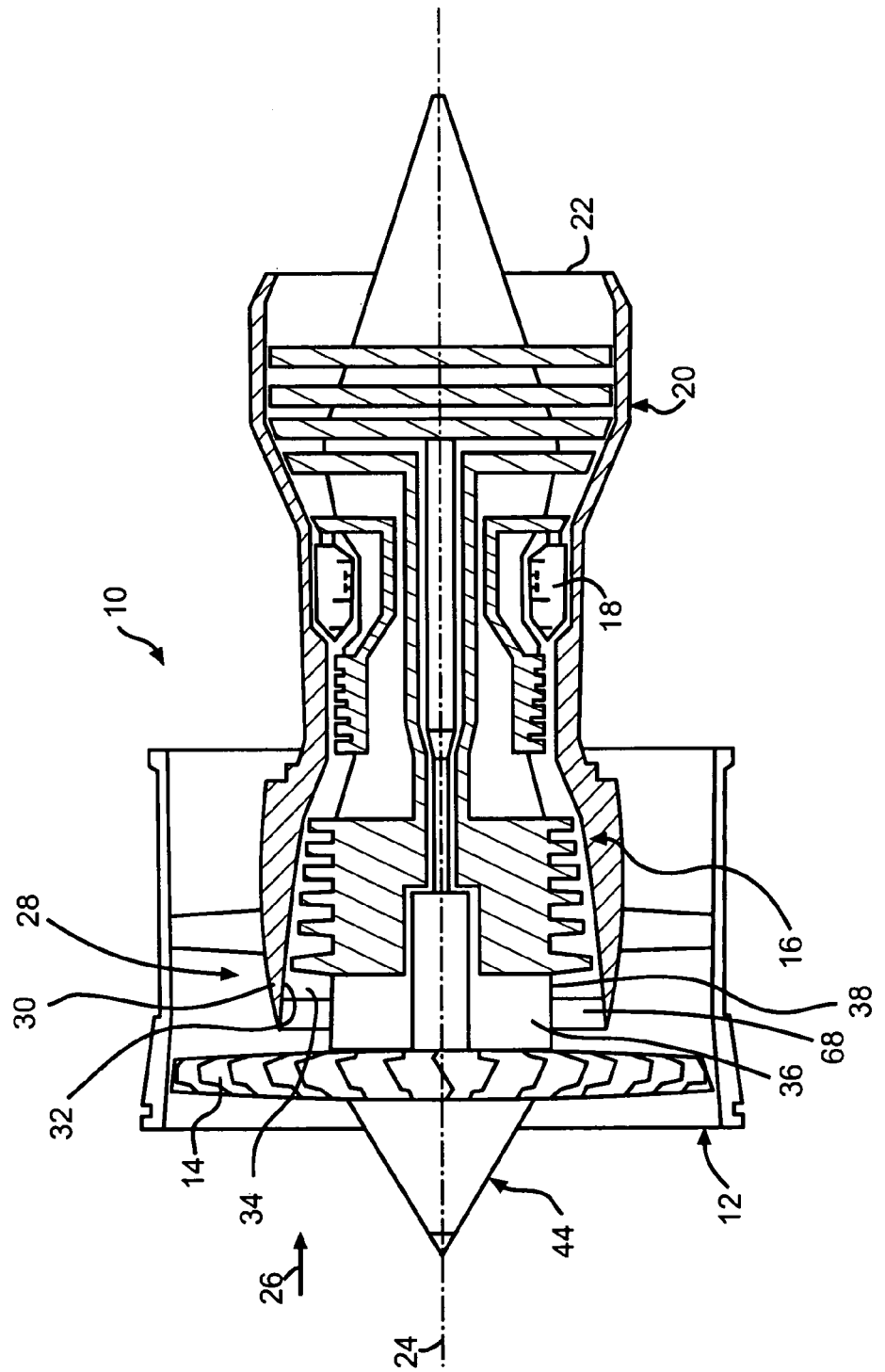
FIG. 1 is a cross-section of a turbine engine according to an embodiment of the invention.

The exemplary embodiment of the broader invention will now be described more fully. Referring to FIG. 1, a power plant such as a turbine engine 10 can include an inlet 12 and a fan 14. The exemplary fan 14 can be an assembly of, by way of example and not limitation, a disk, a plurality of blades received in slots in the disk, and a retainer. In alternative embodiments, the fan can be a "blisk" wherein the blades and the disk are integral. The turbine engine can also include a compressor section 16, a combustor section 18, and a turbine section 20. The turbine engine 10 can also include an exhaust section 22. The fan 14, compressor section 16, and turbine section 20 are all arranged to rotate about a centerline axis 24. A working fluid such as air can be drawn into the turbine engine 10 as indicated by the arrow referenced at 26. The fan 14 directs fluid to the compressor section 16 where it is compressed. The compressed fluid is mixed with fuel and ignited in the combustor section 18. Combustion gases exit the combustor section 18 and flow through the turbine section 20. Energy is extracted from the combustion gases in the turbine section 20.

Figure 2:
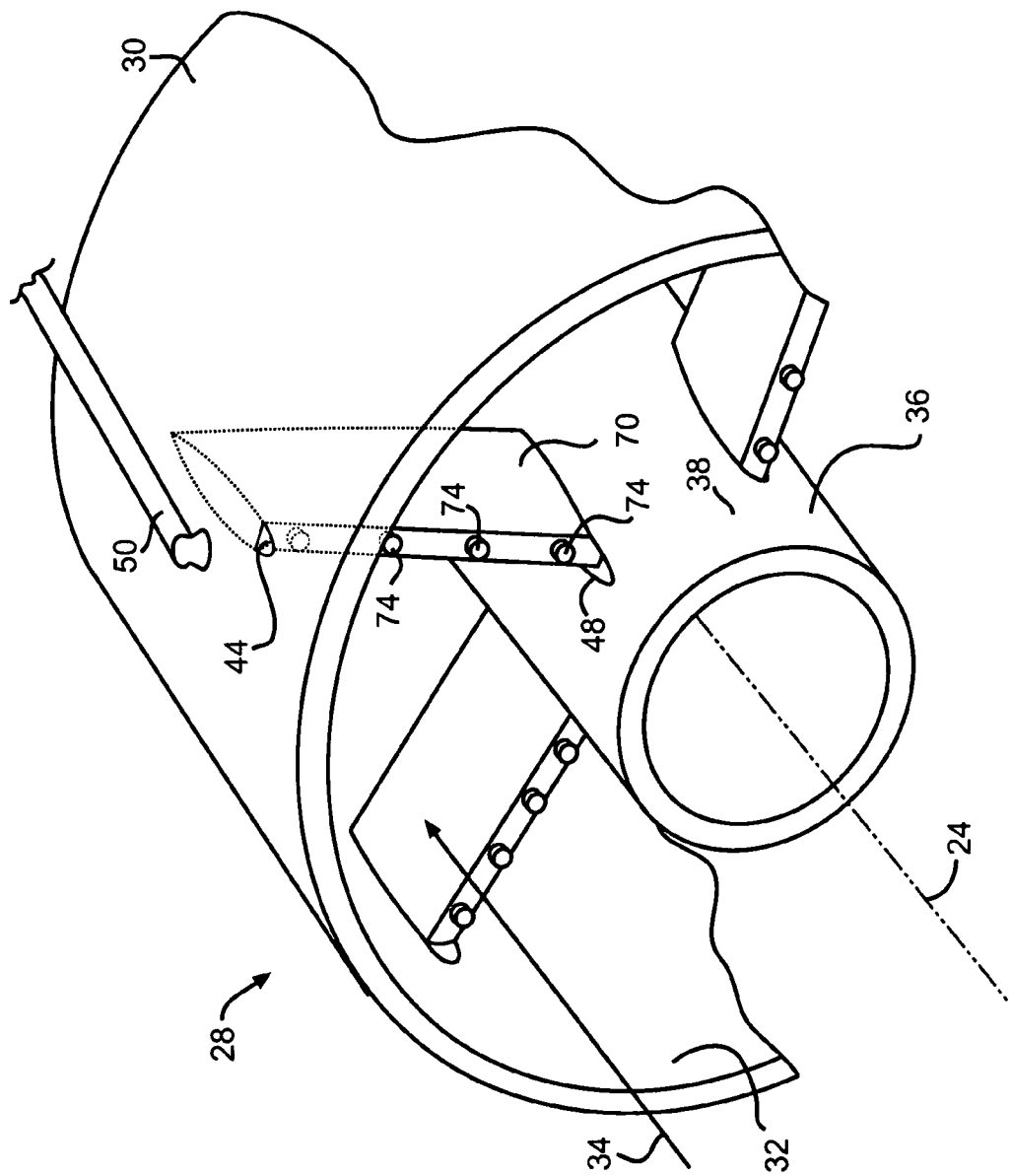
FIG. 2 is a perspective view of an air intake assembly according to an embodiment of the invention.

FIGS. 1 and 2 also show an air intake assembly 28 for the turbine engine 10. The air intake assembly 28 can include an outer annular casing 30 encircling the axis 24 and defining an outer boundary 32 of a flow path 34 for working fluid (represented by an arrow in FIG. 2). The air intake assembly 28 can also include a hub 36 concentric with and encircled by the outer annular casing 30. The hub 36 can define an inner boundary 38 of the flow path 34 for the working fluid.

Figure 3:
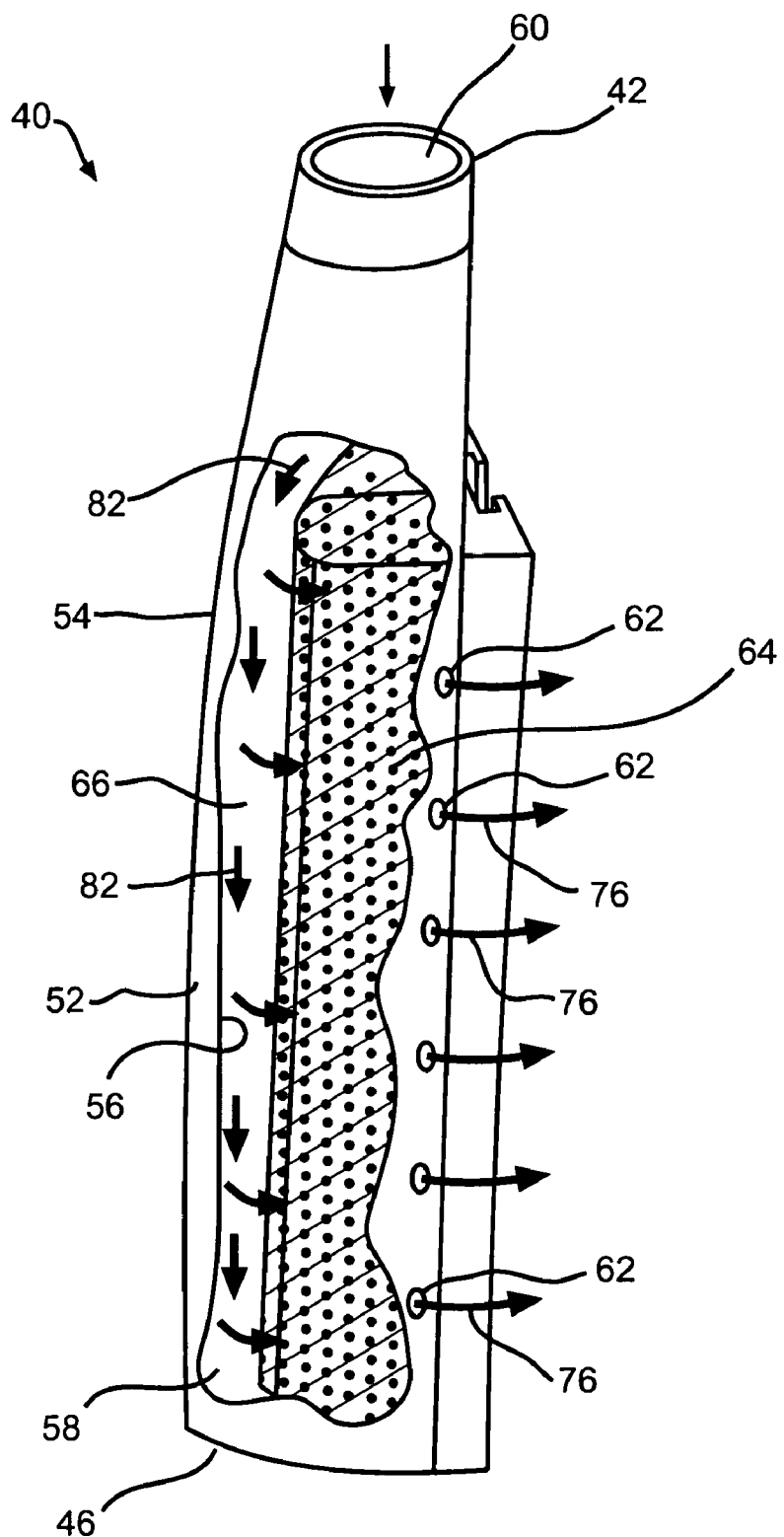
FIG. 3 is a perspective view of a working member according to an embodiment of the invention with a portion cut-away.

An exemplary working member 40 is shown in FIG. 3. The working member 40 can be a portion of a strut 68, shown schematically in FIG. 1, extending between the outer annular casing 30 and the hub 36. FIG. 3 shows the exemplary working member 40 and FIG. 2 shows the remainder of the exemplary air intake assembly 28. A radially outer or top end 42 of the working member 40 can be received in and extend through an aperture 44 defined in the outer annular casing 30. A radially inner or bottom end 46 of the working member 40 can be received in an aperture 48 defined in the hub 36. A height of the exemplary working member 40, or portions thereof, can be defined by the radial distance between the outer annular casing 30 and the hub 36 relative to the axis 24. A width of the exemplary working member 40, or portions thereof, can be defined in a forward-to-aft direction along the axis 24.

The outer end 42 can be coupled to a conduit 50 extending from the compressor section 16 (shown in FIG. 1). The conduit 50 and a portion of the working member 40 at the outer end 42 can define a passageway through which thermal fluid is drawn from the compressor section 16 (shown in FIG. 1). The thermal fluid can be directed into the working member 40 as will be described in greater detail below.

It is noted that in the exemplary embodiment of the invention, the working member 40 can be heated with fluid drawn from the compressor section. However, in alternative embodiments of the invention, fluid may be drawn from a different source and/or may cool a working member. The invention is not limited to an arrangement for heating a portion of a strut of an air intake assembly.

The exemplary working member 40 includes a body 52 defining at least one working surface 54 of the working member 40. The exemplary body 42 can be metallic, such as aluminum, titanium, steel, or another material that is conductive of thermal energy. The working surface 54 is operable to contact the working fluid. In the exemplary embodiment of the invention, the working surface 54 can define a leading edge of the working member 40 and divert the flow of the working fluid around itself. In other embodiments of the invention, the surface 54 can be a face of a blade or vane, or a portion thereof, or some other working surface of a working member. The body 52 also includes at least one inner surface 56 opposite the working surface 54. The outer and inner surfaces 54, 56 can be separated by a wall thickness of the body 52. The inner surface 56 is substantially isolated from the flow path 34 (shown in FIG. 2) of the working fluid.

The working member 40 also includes an interior chamber 58 defined within at least part of the body 52 proximate to the working surface 54. The wall thickness of the body 52 can be minimized at the location of the surface 54 so that the distance between the interior chamber 58 and the surface 54 is minimized. The working member 40 also includes at least one inlet 60 to the interior chamber 58. The inlet 60 can communicate with the passageway defined at least in part by the conduit 50 (shown in FIG. 2) to receive thermal fluid from the compressor section 16 (shown in FIG. 1). The working member 40 also includes at least one outlet 62 from the interior chamber 58. The outlet 62 communicates with the flow path 34 (shown in FIG. 2). Fluid can be received in the interior chamber 58 from the compressor section 16 (shown in FIG. 1) through the one or more inlets, such as inlet 60, and exit the interior chamber 58 through one or more of the outlets 62.

The working member 40 also includes a quantity 64 of open-cell foam positioned in the interior chamber 58 between the inlet 60 and the outlet 62. The quantity 64 of open-cell foam defines a plurality of tortuous paths of movement for the thermal fluid. The quantity 64 of open-cell foam can be formed to have relatively large cells or small cells. In one embodiment of the invention, the quantity 64 of open-cell foam can be 90%-95% air by volume. In any particular operating environment, the size of the cells can be selected to enhance fluid flow and/or the thermal transfer in the matrix defined by the cells. For example, it may be desirable to vary the density of the open-cell foam to produce a relatively constant fluid flow rate out of the outlets 62 along the entire height. The quantity 64 of open-cell foam can be a porous metal, a foam metal, a fiber metal. The quantity 64 of open-cell foam can be formed with any foam metal forming processes including bubbling gas through molten aluminum and aluminum alloys; stirring a foaming agent into a molten alloy and controlling pressure while cooling; consolidating metal powder with a foaming agent and heating to a state between fully solid and fully liquid; vapor phase deposition of metal onto a polymer foam precursor that is subsequently burned out; trapping high-pressure inert gas in pores by powder hot isostatic pressing followed by expansion of the gas at elevated temperatures; or any other method.

The quantity 64 of open-cell foam is positioned in the interior chamber 58 between the inlet 60 and the outlet 62. The quantity 64 of open-cell foam fills less than all of the interior chamber 58 such that at least one empty space 66 is defined in the interior chamber 58 between the at least one inner surface 56 and the quantity 64 of open-cell foam. The empty space 66 is thus close to the surface that is to be thermally-manipulated, the surface 54 in the exemplary embodiment. Thus, the air flow from the compressor section 16 passes through the inlet 60, the empty space 66, the quantity 64 of open cell foam, and then the outlets 62.

Figure 4:
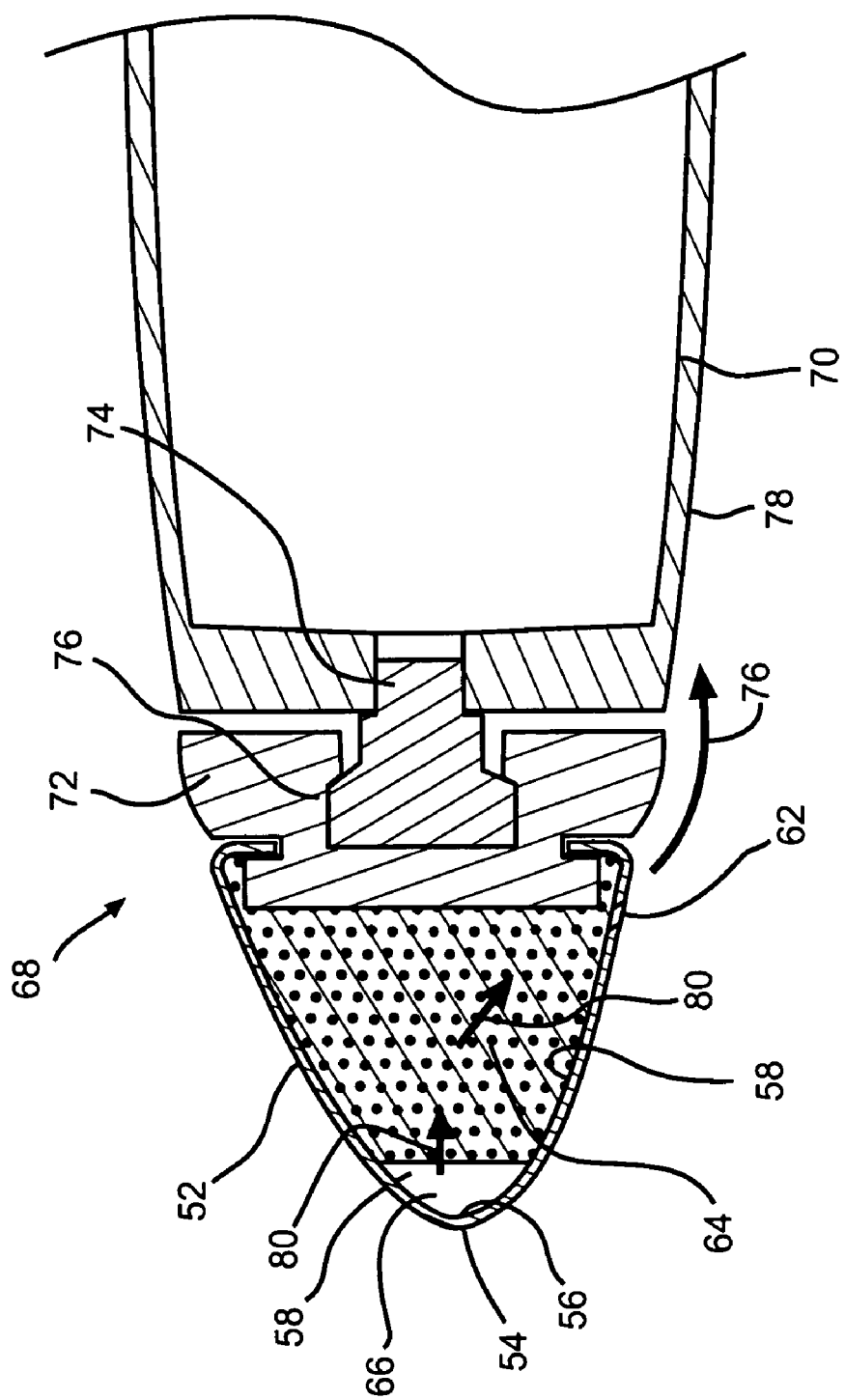
FIG. 4 is a cross-sectional view the working member shown in FIG. 3 showing a plane containing an axis parallel to the central axis of the air intake assembly.

In the various Figures, the air flow is represented by arrows 76, 80 and 82. Arrows 76 are shown in FIGS. 3 and 4 and represent exhaust flow, the flow after the air has passed through the outlet 62. Arrows 80 are shown in FIG. 4 and represent flow passing through the quantity 64 of open-cell foam. Arrows 82 are shown in FIG. 3 and represent flow in the empty space 66, upstream of the quantity 64 of open-cell foam.

The thermal fluid can therefore be directed to the structure defining the working surface at its optimum temperature. In the exemplary embodiment of the invention, the thermal fluid can be directed to the structure defining the working surface at its highest temperature. The thermal fluid has not passed through and transmitted heat to the quantity 64 of open-cell foam prior to delivering heat (thermal energy) to the structure defining the working surface 54. Therefore, thermal energy can be absorbed from or transmitted to the working surface at a maximized rate since the thermal fluid is at its highest temperature when it contacts the structure defining the working surface.

The working member 40 can be formed and/or constructed such that a dimension of the empty space 66 is substantially constant along a dimension of the body 52. In the exemplary embodiment, the empty space 66 extends substantially the entire height of the working member 40. In alternative embodiments of the invention, the empty space 66 can extend along a majority of one or more dimensions of the body, such as forward-to-aft width or internal depth. A width of the exemplary empty space 66 can be continuous along the height, limiting the restriction on the flow of thermal fluid.

The size/volume of the empty space 66 can be as small or large as desired in various embodiments of the invention. If, for example, thermal transfer of a particular point or small surface area is desired, the empty space can be smaller. On the other hand, if a large or long surface is to be heated or cooled, the empty space can be larger.

The quantity 64 of open-cell foam can define a majority of a boundary of the empty space 66 along at least one dimension of the body 52. In the exemplary embodiment, the quantity 64 of open-cell foam defines a majority of an aft boundary of the empty space 66 along the height of the working member 40. In alternative embodiments of the invention, the quantity 64 of open-cell foam can define a boundary of the empty space 66 along another dimension of the working body 40. Thus, the open-cell foam need not separated from the empty space 66 by a rib or wall which has metering holes. Substantially a full face of the open-cell foam is capable of receiving the flow of thermal fluid. When the area of contact between the open-cell foam and the empty space 66 is greater, the flow rate of thermal fluid through the open-cell foam at a particular pressure gradient can be reduced, allowing the thermal fluid to move more slowly through the open-cell foam and transfer more thermal energy with the quantity 64 of open-cell foam.

The size/volume of the quantity 64 of open-cell foam can be as small or large as desired in various embodiments of the invention. The exemplary quantity 64 of open-cell foam extends continuously over a majority of the height of the body 52. A forward-to-aft width of the quantity 64 of open-cell foam can vary over the height of the working member 40 to promote a substantially constant flow rate of the thermal fluid at all heights of the strut 68. Also, the density of the quantity 64 of open-cell foam can be varied over the height to control the flow rate of thermal fluid at various locations along the height.

In the exemplary embodiment of the invention, the working member 40 is part of the strut 68 (shown in FIG. 1 and partially in FIG. 4) of the air intake assembly 28 (shown in FIGS. 1 and 2). In addition to the working member 40, the strut 68 can also include a second body 70 (shown in FIGS. 2 and 4) engaged with the annular outer casing 30 and the hub 36. The second body 70 is also coupled to the first body 52. The first body 52 can be metallic and the second body 70 can be formed from a composite of materials. The second body 70 can be stronger (by weight) and less thermally conductive than first body 52. Thus, the strut 68 can include a composite portion for a desirable combination of strength and weight and also include a metallic component to define a working surface subject to undesirable temperature-related conditions during operation. The metallic component can be better suited than the composite component to accomplish thermal transfer at the working surface. The composite component, on the other hand, can provide desired strength at a lower weight than a full metallic strut.

Referring now to FIG. 4, the exemplary strut 68 can also include a third body 72 positioned between the first and second bodies 52, 70. The third body 72 can be less thermally conductive than first body 52 so thermal energy transfer between the first and second bodies 52, 70 is limited or eliminated. Heat extracted by the quantity 64 of open cell foam can be conducted to the shell or body 52 and thereby protect the second body 70, which can be formed as a composite and be less capable of handling higher temperatures. The conduction of heat through the foam to the body 52 allows the heat to be transferred to the incoming air over a relatively large surface defined by the outside of the body 52. The third body 72 can be formed from a machinable ceramic. The third body 72 can extend radially between the outer annular casing 30 and the hub 36 substantially parallel to the first body 52 and the second body 70. As shown by FIG. 4, the first body 52 can be fixedly engaged with the third body 72. The third body 72 can be removably engaged with the second body 70 through pins 74 fixed to the second body 70. The third body 72 can define a slot 76 for receiving the pins 74. In one example, the combined first and third bodies 52, 72 can be slid radially into position relative to the second body 72.

As shown in the drawings and described above, the air flow out of the empty space 66 (through the quantity 64 of open cell foam in the exemplary embodiment) can be more restricted than the air flow into the empty space 66 (through the inlet 60 in the exemplary embodiment). As a result, the relatively hot air from the compressor section 16 can bathe the inner surface 56 of the wall defining the leading edge. The relatively hot air from the compressor section 16 can be flowing but can generally dwell in the empty space 66 so that the rate and efficiency of heat transfer can be maximized compared to directing hot air through a strut having substantially similar inlets and outlets, or directing air through open cell foam prior to the air contacting the wall defining the working surface. The tortuous paths defined by the quantity 64 of open cell foam allow the exemplary embodiment to extract a maximum amount of the remaining heat from the air before the air passes through the one or more outlets 62. Also, the outlets can be angled or arranged such that the air is directed generally to pass across a surface of the strut 68 aft of the leading edge. As shown in FIG. 4, exhaust air represented by arrow 76 can pass out of the outlet 62 and pass across a surface 78 of the second body 70. Thus, any heat remaining can be transferred to the second body 70.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The right to claim elements and/or sub-combinations of the combinations disclosed herein is hereby reserved.

What is claimed is:

1. A working member for a power plant comprising:
   a body defining at least one working surface of said working member operable to contact a working fluid and also having at least one inner surface opposite said at least one working surface;
   an interior chamber defined within at least part of said body proximate to said at least one working surface;
   at least one inlet to said interior chamber;
   at least one outlet from said interior chamber; and
   a quantity of open-cell foam positioned in said interior chamber between said inlet and said outlet, wherein said quantity of open-cell foam fills less than all of said interior chamber such that at least one empty space is defined in said interior chamber between said at least one inner surface and said quantity of open-cell foam.

2. The working member of claim 1 wherein said at least one working surface is further defined as a leading edge of said working member.

3. The working member of claim 1 wherein a dimension of said empty space is substantially constant along a dimension of said body.

4. The working member of claim 3 wherein a width of said empty space is substantially continuous along a majority of a height of said body.

5. The working member of claim 1 wherein said quantity of open-cell foam defines a majority of a boundary of said empty space along at least one dimension of said body.

6. The working member of claim 5 wherein said quantity of open-cell foam defines a majority of said boundary of said empty space along a height of said body.

7. The working member of claim 1 wherein said quantity of open-cell foam extends continuously over a majority of at least one dimension of said body.

8. The working member of claim 7 wherein said quantity of open-cell foam extends continuously over a majority of a height of said body.

9. The working member of claim 1 wherein both of said empty space and said quantity of open-cell foam extend continuously over a majority of a common dimension of said body with said quantity of open-cell foam defining a boundary of said empty space along substantially a majority of said common dimension.

10. A method of deicing a strut of an intake air intake assembly for a turbine engine comprising the steps of:
defining a substantially empty space in the strut adjacent to an inner side of a wall of the strut defining a leading edge of the strut, the strut including at least one inlet entering the strut and at least one outlet exiting the strut;
directing air from a compressor section of the turbine engine through the inlet to the empty space; and
restricting the flow out of the empty space greater than the restriction of flow into the empty space, the restricting comprising passing the flow through a restrictor positioned within the strut adjacent the empty space between the inlet and the outlet.

11. The method of claim 10 further comprising the step of: channeling the flow out of the empty space through a plurality of tortuous paths.

12. The method of claim 11 further comprising the step of: releasing the air flow exiting the tortuous paths into a stream of working fluid entering the compressor section.

13. The method of claim 12 further comprising the step of: directing the exhaust across a surface of the strut aft of the leading edge.

14. The method of claim 10 wherein the inner side of the wall of the strut is opposite at least one working surface defining the leading edge of the strut, the at least one working surface in contact with an air intake flow path passing through the intake assembly.

15. The method of claim 10 wherein the restrictor comprises a quantity of open-cell foam.

16. A method of deicing a strut of an intake air intake assembly for a turbine engine comprising the steps of:
defining a substantially empty space in the strut adjacent to an inner side of a wall of the strut defining a leading edge of the strut;
directing air from a compressor section of the turbine engine to the empty space; and
restricting the flow out of the empty space greater than the restriction of flow into the empty space; and
channeling the flow out of the empty space through a plurality of tortuous paths, wherein said channeling is further defined as: channeling the flow out of the empty space through a plurality of tortuous paths defined by a quantity of open-cell foam.

17. An air intake assembly for a turbine engine comprising:
an outer annular casing encircling an axis and defining an outer annular boundary of a flow path for working fluid;
a hub concentric with and encircled by said outer annular casing and defining an inner boundary of said flow path for working fluid; and
at least one working member being a strut extending radially between said outer annular casing and said hub and having:
a first body defining at least one working surface of said working member operable to contact a working fluid and at least one inner surface opposite said at least one working surface wherein said at least one working surface defines a leading edge of said at least one working member,
an interior chamber defined within at least part of said first body proximate to said at least one working surface,
at least one inlet to said interior chamber,
at least one outlet from said interior chamber, and
a quantity of open-cell foam positioned in said interior chamber between said inlet and said outlet, wherein said quantity of open-cell foam fills less than all of said interior chamber such that at least one empty space is defined in said interior chamber between said at least one inner surface and said quantity of open-cell foam, wherein said empty space extends along said at least one inner surface opposite said leading edge.

18. The air intake assembly of claim 17 wherein said first body extends a height between said outer annular casing and said hub and said empty space extends substantially all of said height.

19. The air intake assembly of claim 17 wherein said first body extends a height between said outer annular casing and said hub and a width of said empty space in a forward to aft direction varies over said height.

20. The air intake assembly of claim 17 wherein said first body extends a height between said outer annular casing and said hub and a density of said quantity of open-cell foam varies over said height.

21. The air intake assembly of claim 17 wherein said first body is metallic and said at least one working member further comprises:
a second body formed from a composite of materials and extending radially between said outer annular casing and said hub substantially parallel to said first body; and
a third body positioned between said first and second bodies and being less thermally conductive than said first body.

22. The air intake assembly of claim 21 wherein said at least one outlet opens to said flow path upstream of said second body.

23. A method of deicing a strut of an intake air intake assembly for a turbine engine comprising the steps of:
defining a substantially empty space in the strut adjacent to an inner side of a wall of the strut defining a leading edge of the strut;
directing air from a compressor section of the turbine engine to the empty space; and
restricting the flow out of the empty space greater than the restriction of flow into the empty space by passing the flow through a quantity of open-cell foam.

* * * * *